United States Patent [19]

Burrage

[11] 4,453,197
[45] Jun. 5, 1984

[54] DIELECTRIC FLUID TANK

[75] Inventor: Lawrence M. Burrage, Milwaukee, Wis.

[73] Assignee: McGraw-Edison Company, Rolling Meadows, Ill.

[21] Appl. No.: 314,006

[22] Filed: Oct. 22, 1981

[51] Int. Cl.[3] .............................................. H01G 1/02
[52] U.S. Cl. ............................... 361/272; 174/17 LF; 220/89 A; 361/15
[58] Field of Search ..................... 174/17 LF, 17 VA; 361/272, 301, 15; 220/89 A

[56] References Cited

U.S. PATENT DOCUMENTS

| | | |
|---|---|---|
| 2,199,519 | 5/1940 | Collins et al. |
| 2,547,521 | 4/1951 | Buehler ............................ 220/89 A |
| 3,483,453 | 12/1969 | Meyers |
| 4,106,068 | 8/1978 | Flanagan .............................. 361/15 |
| 4,173,776 | 11/1979 | Mercier .............................. 361/272 |

Primary Examiner—B. A. Reynolds
Assistant Examiner—Alfred S. Keve
Attorney, Agent, or Firm—James A. Gabala; J. C. Gealow; Hugh Gilroy

[57] ABSTRACT

A unique design and method of construction is presented for a tank-like structure which houses an electrical component immersed within a dielectric fluid. The tank is formed by a generally cup-shaped enclosure and a cover. In one embodiment the cover carries a means for electrically connecting the interior of the tank with its exterior. The cover and the enclosure are joined by an overlapping edge means. By overlapping the marginal portions of the cover and the enclosure, such that the leading edges are disposed in the opposite direction, a joint is formed which is less likely to rupture than one formed by overlapping the marginal portions with the leading edges disposed in the same direction. The overlapping edge means, allows the designer to pre-select that portion of the interface between the cover and the enclosure where, in the event of an overpressure condition within the tank, a rupture should preferably occur, thereby minimizing the damage which could result from the discharge of pressurized gas and liquid. The tank design also includes provision for a retention means to hold the solid portions of the electrical apparatus housed by the tank within the tank in the event that the tank ruptures and fluid is lost. Several specific embodiments are illustrated and described in detail, with specific reference to a tank which houses a plurality of capacitor packs.

11 Claims, 17 Drawing Figures

U.S. Patent   Jun. 5, 1984   Sheet 1 of 4   4,453,197
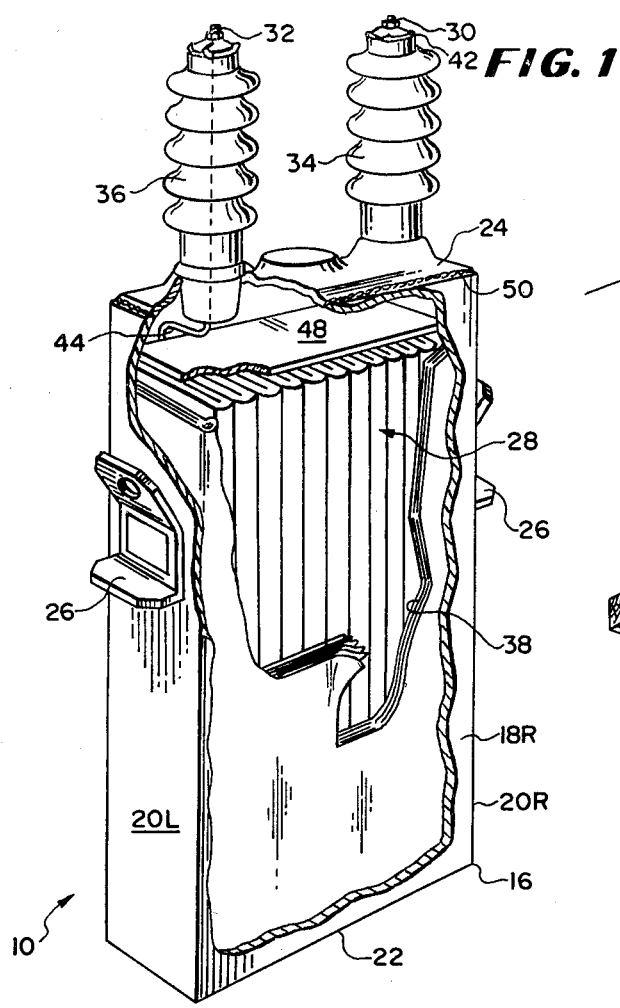
FIG. 1
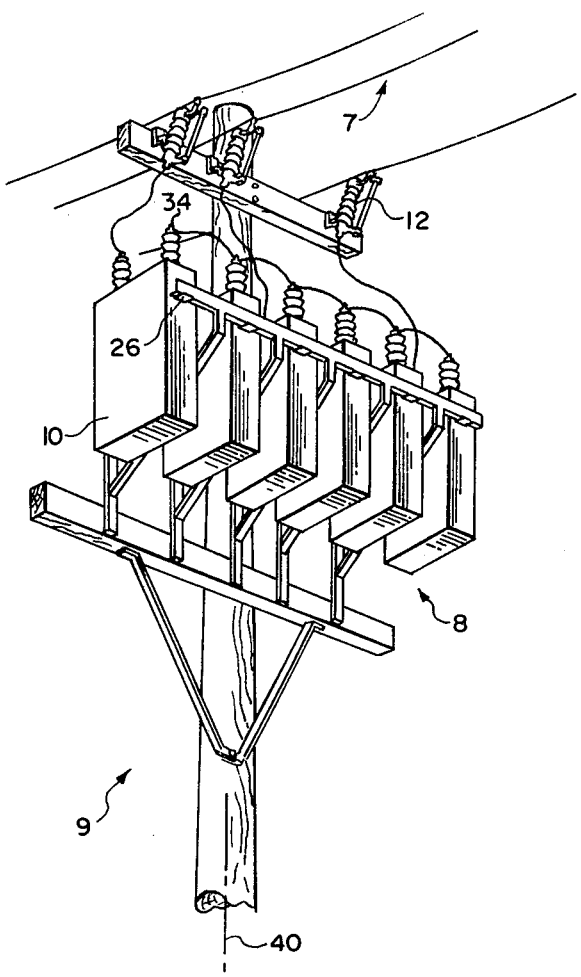
FIG. 2
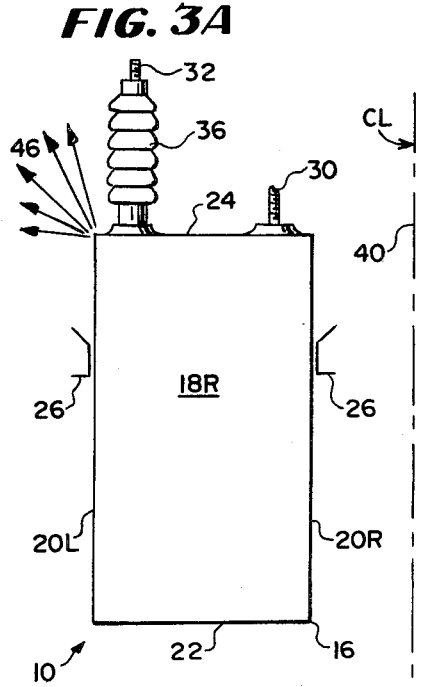
FIG. 3A
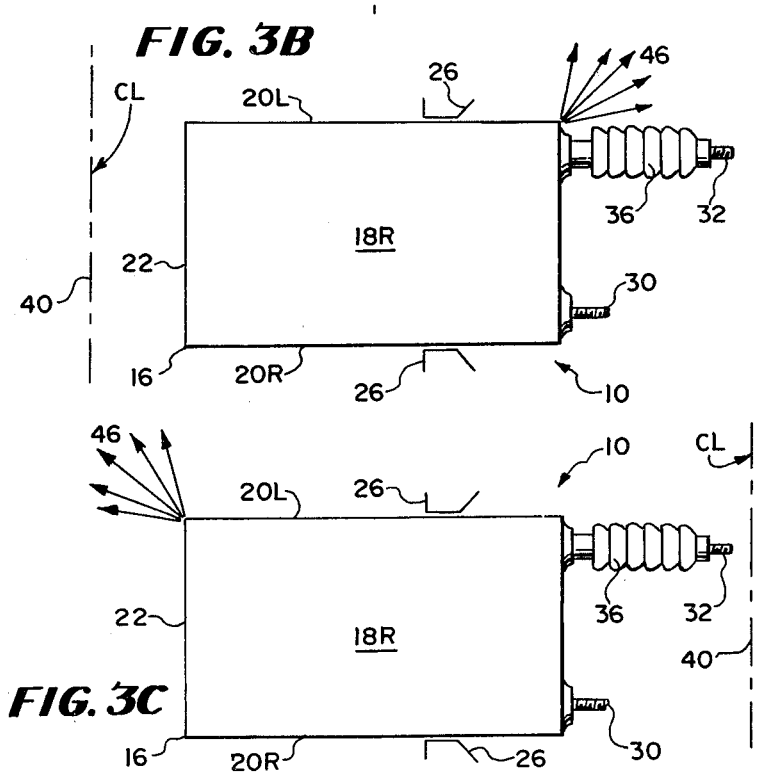
FIG. 3B
FIG. 3C

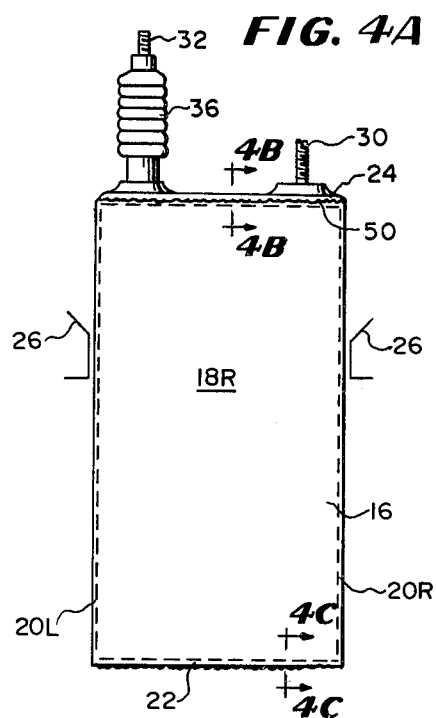
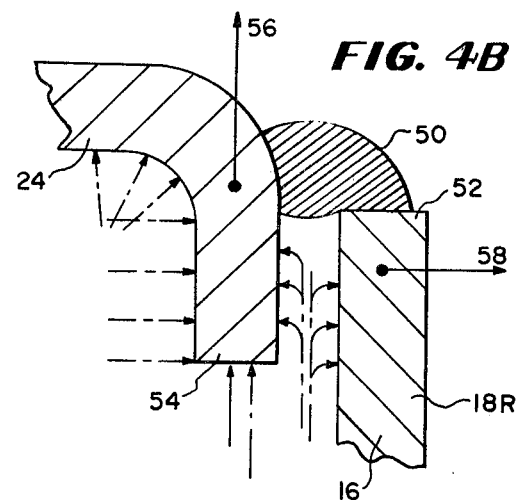
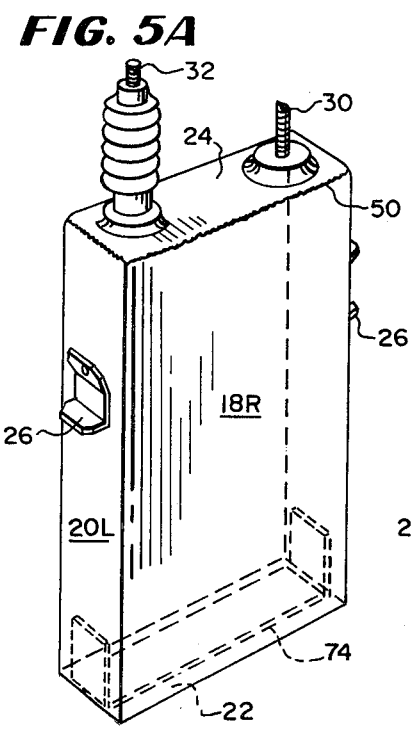
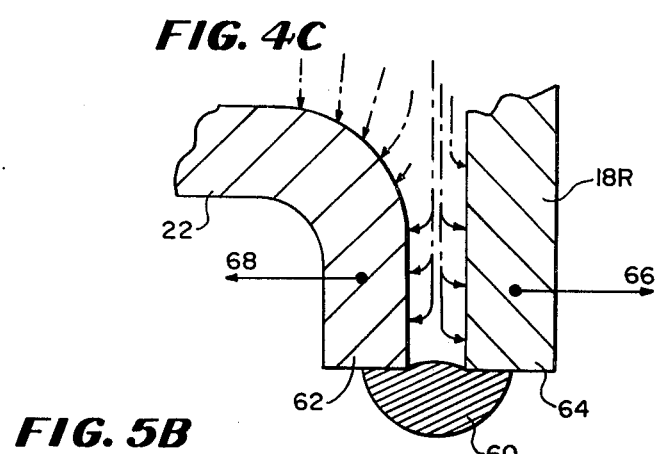
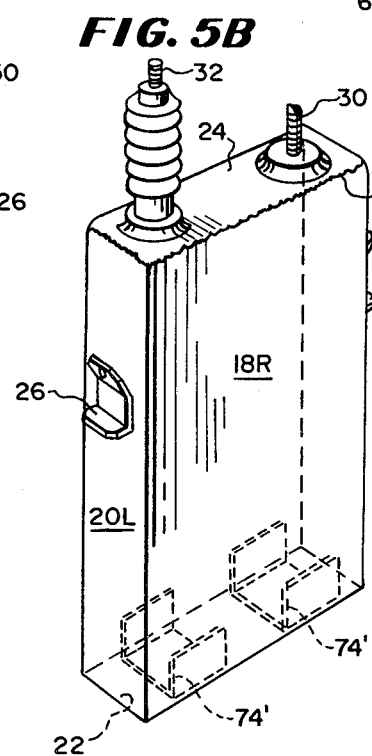
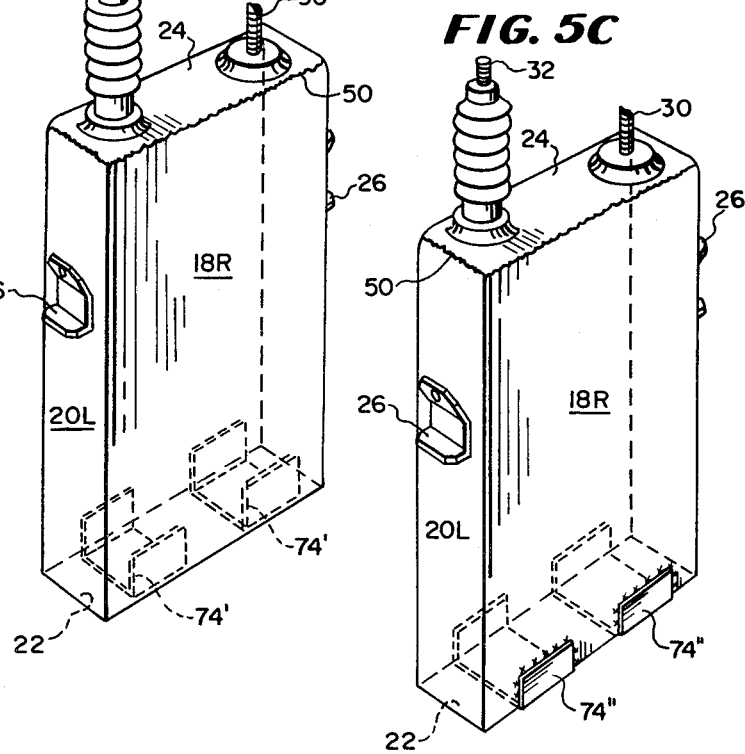

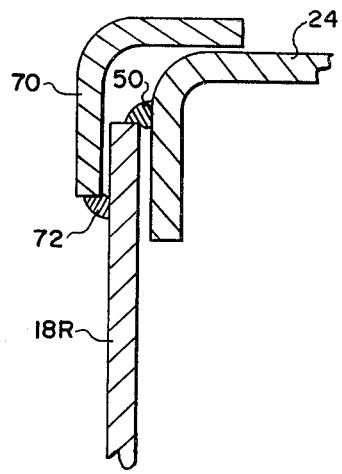
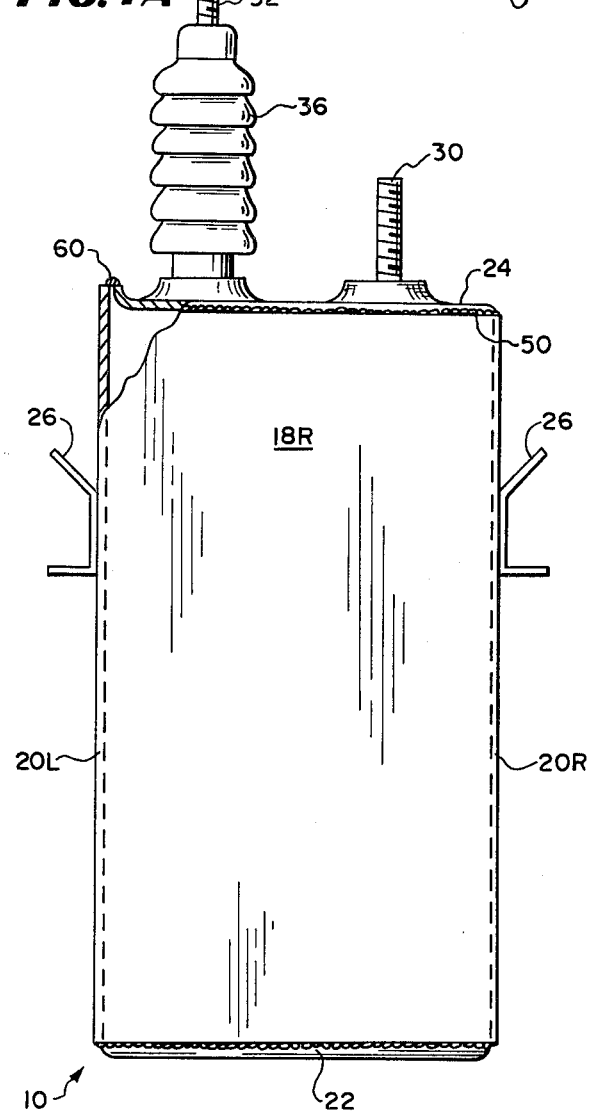
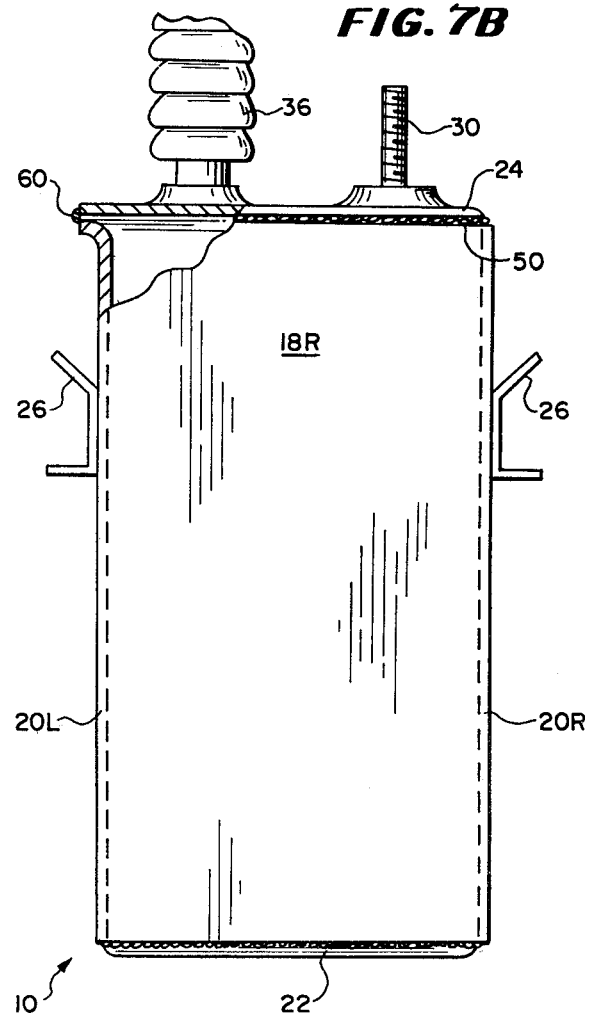

DIELECTRIC FLUID TANK

TECHNICAL FIELD

This invention relates to an improved design for a tank or vessel of the type adapted to house an electrical component such as a capacitor or transformer which is surrounded by a dielectric fluid. In particular, the invention is related to the manner in which the sealing joints of the tank are formed to pre-select the location where rupture will occur in the event of uncontrolled expansion of the dielectric fluid or tank overpressurization.

BACKGROUND OF THE INVENTION

Power factor correction capacitors and transformers are widely used on electrical transmission and electrical distribution systems. These devices incorporate a tank-like structure for confining a dielectric about an electrical component through which electrical current flows. Good engineering requires that the designer consider the probability that these devices will fail in service.

In the case of a power factor correction capacitor, tank rupture will occur if the total energy applied to the capacitor under failure conditions (e.g. dielectric breakdown, internal short-circuiting, etc.) is greater than the ability of the tank structure to contain such energy. The energy applied can occur under a wide variety of current-time conditions ranging from currents modestly in excess of normal ratings for periods of days, weeks, months or longer, to very high currents over a very short period of time, such as would occur during the dumping of energy stored in a parallel set of capacitors in a large shunt bank into a failed capacitor unit. The specific cause of tank rupture is internal pressure, either isobaric or localized, which is sufficient to stretch the structural members which form the capacitor tank beyond their ultimate strength. The increase in internal pressure is caused by self-generated heat losses and by arcing; rupture times less than 10 minutes are caused primarily by internal arcing (*Standard Handbook for Electrical Engineers,* by D. G. Fink, 11th Edition, Chapter 10, Article 276). The amount of arcing, in turn, is determined by the location of the failure, the construction of the capacitor and the magnitude and duration of the fault current.

In the event of failure of the capacitor, the normal protective device—typically a fuse—should disconnect the capacitor from the energized circuit prior to rupturing (e.g. the venting of vapors, liquids and/or solids which may or may not be burning at the time of expulsion) the capacitor enclosure or tank. Unfortunately, fuse selection involves much of the same engineering judgement that goes into the design, manufacture and service application of capacitors; therefore, it is possible for a capacitor to rupture or fail when it is placed in service despite the use of fuse protection.

The most commonly used—and lowest cost—fuse type is the expulsion fuse consisting of a fusible link in an expulsion tube. These are available from several manufacturers in a wide range of current ratings, voltage ratings, and fusible elements.

Effectiveness of fuse protection is usually studied by superposition of the expulsion fuse characteristic upon the capacitor characteristic. The conventional view is that if the fuse maximum $I^2t$ "let through characteristic" is everywhere less than the capacitor "withstand characteristic," the capacitor can be protected from rupture by that fuse. If there is an intersection of the two characteristics, and if the capacitor-fuse combination is expected to operate under the condition prescribed by that intersection, then the probability of that fuse preventing rupture is low.

The protective characteristic of an expulsion fuse is a plot of the Maximum $I^2t$ Let-Through vs. Symmetric Fault Current. In the low current region, the $I^2t$ characteristic approaches infinity as the steady state current capability is approached. The minimum $I^2t$ value is determined by the fusible element size and type. It also takes into account variabilities in performance caused by manufacturing tolerances as well. In the higher current range, $I^2t$ increases directly as the square of the magnitude of the fault current (i.e. virtually independent of the time during which the fault current flows).

Two other fuses, the vacuum fuse and the chemical fuse, have characteristics similar in shape to those of the expulsion fuse family. A current limiting fuse has a different protective characteristic. The major difference in the shape of the current limiting characteristic in comparison to that of the expulsion fuse is in the high current region where a maximum, approximately constant value of $I^2t$ is observed.

In today's marketplace there are two types of capacitor dielectric systems—the paper/film/fluid and the All-Film/fluid. (See J. Lapp, "A New Dielectric Fluid for Power Capacitors," Pennsylvania Electric Association, Pittsburgh, PA., Oct. 6, 1976 [McGraw-Edison Bulletin 77016]). Both are impregnated with insulating fluids of various types. The two systems have markedly different rupture characteristics, essentially independent of the type of insulating fluid used. These differences are due to the gassing behavior of a failing paper/film unit in the low current region compared to the non-gassing behavior of a failing All-Film unit in the same current range.

During a progressive failure in a paper/film design an electrical puncture (e.g. arc) of the film/paper/film pack will raise the temperature of the materials in the immediate vicinity of the discharge. This increases the film's solubility in the liquid dielectric and exposes the paper to the arc, thereby permitting the generation of gases during the subsequent decomposition of the paper and the fluid. Continued arcing will cause sufficient gas to be produced to cause the tank to swell. This, in turn, lowers the fluid level, possibly exposing the tops of the packs, and increasing the likelihood of internal flashover and subsequent generation of large quantities of gas.

The failure of one pack will cause an increase in the voltage stress across the remaining series pack groups. The continuation of arcing, swelling, and pack overvoltage will cause the failure to progress, further increasing the current level, and therefore causing more arcing, more gassing, etc. If the capacitor is not disconnected from the system sufficient gas can be generated to cause the tank to rupture.

The lowest currents which may be encountered during the failure of a single pack of a capacitor, range from 111% of the rated current for a 12-series group design to 200% of rated current for a 2-series group design. If alternate internal connections are considered, a single pack failure may result in currents as low as 105% of the rated current. Fusing to prevent rupture under these conditions is extremely difficult unless there is progressive failure and increasing currents. Thus, because of the possible erratic behavior of the paper/film system under failure conditions, the characteristic for the paper/film unit can only be considered approximate.

When an All-Film unit (of the type described by U.S. Pat. No. 3,746,953) is caused to fail under these same conditions, the liquid and the film in the immediate vicinity of the discharge increase in temperature. This causes the solubility of the film in the fluid to increase and allows the deformed foil electrodes to make intimate contact, thereby shorting out the affected capacitor pack and thereby eliminating the arc. With no arc, no gas will be generated; with no gas generated there will be no swelling; and with no swelling there will be no possibility of rupture. Although the shorted pack will cause the voltage stress across the remaining series pack groups to increase, increasing the probability of their failure, gas will not be generated in appreciable quantities unless there is an internal arc. Experience has shown that an arc will not occur in the All-Film capacitor until after all of the series groups have been shorted. Thus, good fusing practices should permit a failing All-Film capacitor to be disconnected from the distribution system long before sufficient gas has been generated to cause tank rupture.

A second type of internal failure consists of the puncture of the capacitor tank insulation resulting in a pack-to-tank arc. This type of failure is rare. There may be, however, a higher probability of this phenomenon occurring in a partially or fully failed paper/film unit aided and abetted by extensive decomposition of other internal materials than there is for the All-Film capacitor, when the capacitor tank is connected to ground and the distribution system neutral is isolated.

In summary, both the expulsion fuse (for symmetric current values less than that defined by the intersection of the two characteristics) and the current-limiting fuse (through the entire current range) can be relied upon to prevent capacitor tank rupture for All-Film units. This is not true for paper/film units. No known fuse—or combination of fuses—can reliably prevent the paper/film units from rupturing under the low-current and internal failure-fault conditions. This is particularly true when partial failure of the capacitor may involve currents only a few percent more than the rated current. Fuses are not normally responsive to such a small increase in current and therefore will not melt or clear the fault under these conditions. Thus, means other than fuses must be used to prevent capacitor tank rupture.

Various means have been devised for venting or releasing the build up of pressure within the pressure vessel or container which houses the capacitor elements or plates. Sprague (U.S. Pat. No. 2,005,055) describes a device incorporating a semi-permeable gasket to control the escape of gases. Peace (U.S. Pat. No. 3,197,547) describes a construction similar to that described by Sprague.

Collins (U.S. Pat. No. 2,199,519) noted that in some types of electrolytic condensers (particularly in dry electrolytic condensers which have a lower heat capacity and a poorer heat dissipation than wet electrolytic condensers), conditions may arise which cause such a large amount of gas to be liberated that a semi-permeable gasket is unacceptable. Collins disclosed an emergency venting means comprising a weakened portion of a condenser container which is pierced by a pressure of a predetermined value so as to prevent the container from exploding. Steele (U.S. Pat. No. 3,401,314) uses a cover member incorporating a venting means similar to that of Collins. Moresi (U.S. Pat. No. 3,204,156) provides a capacitor with a pressure release vent in the form of a longitudinal or axial cut or slot in a portion of the inner wall of the capacitor can.

Myers (U.S. Pat. No. 2,235,778) observed, over many years, that capacitors used in induction heating service failed (not because of overload with associated general excess temperature) by sudden, relatively unpredictable deterioration of a small area of capacitor dielectric. Although the deterioration of the dielectric results in an arc and a nominal short circuit, the nature of construction of many capacitors is such that the fault current is less than the rating of the fuse which is selected to carry normal current to the capacitor. In particular, a small fault of this kind can persist long enough to decompose sufficient dielectric material to create disruptive gas pressures. Myers concluded that unless the capacitor is made for relatively low-volt ampere ratings, fuse protection of the thermal or overcurrent type is very unsatisfactory. Myers solved this problem by using a "fault detector" incorporating a bellows actuated switch.

U.S. Pat. No. 3,772,624 to Keogh summarizes the conventional approach to controlling the pressure within a sealed capacitor or transformer. Most of the earlier devices (he notes) were of the frangible disk type. Keogh used a spring-calibrated, automatic restoring pressure relief. More recently vanGils (U.S. Pat. No. 4,245,277) used a pressure relief valve to control the gas pressure inside a capacitor.

Another approach to the persistent problem of tank overpressurization control was taken by Flanagan in U.S. Pat. No. 4,106,068. Flanagan used the teachings of Rayno (U.S. Pat. No. 3,377,510) to use the outward bulging of a capacitor cover (brought about by increased internal pressure) to provide separation of a plurality of tabs or leads electrically joining the interior with the exterior of the capacitor. Finally, Sanvito (U.S. Pat. No. 4,240,126) proposed a device which interrupts the electrical circuit joined to the capacitor if a dangerous pressure is reached inside the casing. In passing, Sanvito noted that it has also been proposed to use wires with a weakened section (i.e. thin silver wires, or different types of insertion connectors, etc.) as the interruption member of the electrical circuit (e.g. somewhat analogous to a fuse).

It will be readily apparent by studying the foregoing patents, that the problem of pressure build-up in a capacitor has not been solved. Moreover, it is clear that there is a long felt need for a solution to the problem of capacitor tank construction in view of the failure of so many others. The various approaches that have been taken to control the build-up of pressure, for the most part, employ components that are relatively costly to manufacture and difficult to construct, considering the relatively close tolerances that must be maintained to insure that the protective device will actuate and that excess pressure will not develop. Thus, current solutions are not entirely satisfactory. Significantly, those skilled in the art have heretofore neglected other important aspects of the problem of capacitor tank rupture.

Consider first the basic premise that, at some time, there will be a capacitor rupture or failure. Based on some direct experience with conventional capacitor tanks which have ruptured, it has been the observation of this inventor that the general location of rupture (i.e. under certain circumstances, can be predicted (i.e. "Shunt Capacitor Tank Rupture Considerations", by L. M. Burrage, paper A76 043-0 IEEE Power Engineering Society Winter Meeting, printed in January, 1976; "*Shunt Capacitor Rupture Prevention—Large Bank Applications*", by L. M. Burrage, paper A76 366-5 IEEE Power Engineering Society printed on Apr. 26, 1976; and "*Capacitor Tank Rupture Prevention—$I^2T$ Considerations*", by L. M. Burrage, IEEE Transactions—Power Apparatus and Systems Vol. 97, No. 2, Mar/Apr 1978, p. 384–391). For example, in the 300 to 400 amp range (for an All-Film type capacitor) bushing fracture is more likely to occur. This failure is caused by melting and arcing of the internal bushing lead, or by melting of the solder connection at the top bushing stud seal. For moderate currents (e.g., in the range of 1600 amps), the All-Film capacitor tank characteristically ruptures along a bottom side seam if not properly fused. As the current gets higher, more of the bottom seams open, allowing the solids to be expelled. At higher currents (e.g. 4000–8000 amperes), both top and bottom seams are likely to rupture, with the likelihood that the top or upper end will open or rupture increasing as the current increases.

However, both the location and extent of the rupture will vary with the conditions which bring about the failure. For example, under certain conditions, extremely violent rupture can occur wherein pieces of porcelain or shrapnel-like pieces of the capacitor tank can be blown out or expelled at high velocity. Bushing fractures normally occur because of the following sequence of events: extra heat pressurizes the capacitor tank causing it to swell and thereby increasing its volume; this causes the liquid level to drop below the top of the bushing whereupon the internal bushing lead wire is exposed to a vapor rather than being immersed in the dielectric fluid; thus, the bushing lead heats causing even more energy to be released into the interior of the tank and ultimately resulting in thermal fracture of the porcelain bushing. Bushing fracture can also occur at extremely high fault currents which cause the bushing lead wire to literally explode.

Therefore, it is believed that, in the design of a protective device for a tank of the type used to confine an dielectric fluid about an electrical component, three factors must be considered. The two most important conditions to be met by such a device are: the elimination of the likelihood of ejection of shrapnel-like pieces of metal or ceramic; and the retention of most, if not all, of the liquid and solid matter within the tank. If the solids are retained, the likelihood of burning components being expelled and thereby starting secondary fires will be markedly reduced, if not completely eliminated. The last factor of importance is to control the direction of venting in the event that an overpressure condition develops within the tank. Preferably, the venting should be directed away from adjacent components or devices operated in conjunction with the housed electrical component. This will minimize the secondary effects of tank rupture or failure. Of course, the orientation of the tank and, in particular, how and where it is mounted, affects the preferred direction of venting. Heretofore, these three important design considerations have not been completely addressed by designers of tanks for capacitors and other electrical components.

Thus, it should be appreciated that the conventional approach taken to protect against the rupture and damage resulting from a failed tank or enclosure filled with electrolyte involves much beyond that of providing a rupture disk or blowout gasket and selecting a fuse for the service conditions likely to be anticipated. What is needed, is an innovative approach to this persistent problem, one that is easy to manufacture and construct, and a solution which incorporates the best knowledge currently available concerning the manner in which modern capacitor tanks and related structures fail. In particular, a tank design or method of construction which can be readily incorporated into the fabrication of conventional power factor correction capacitor tank enclosures would be readily accepted by the industry and would go far to improve the overall safety and reliability of electrical distribution system components and systems.

SUMMARY OF THE INVENTION

In accordance with the present invention a tank (and a method for fabricating a tank) is provided to house an electrical apparatus immersed in a dielectric fluid such that the tank will rupture preferentially along a preselected portion of the tank walls in the event of uncontrolled pressurization. Specifically, a tank is disclosed that is formed from three major parts: a cover; a pressure tight enclosure or main body portion; and an overlapping edge means. The pressure tight enclosure, defining at least one opening, is provided to receive and house an electrical apparatus such as the electrodes or plates of a capacitor or the windings of a transformer. A cover forms the second major part of the tank. The cover is preferably adapted to carry an electrical connection means for electrically connecting the interior of the tank with its exterior. In one embodiment the cover carries an electrical bushing-type fitting. The cover is sized to close-off the opening in the main body portion of the tank. The cover is joined to the main body of the tank by the overlapping edge means. In particular, marginal portions of the cover and marginal portions of the tank body are formed in overlapping relationship such that the respective leading edges of the marginal portions are disposed in opposite directions over a first part of the perimeter of the opening in the tank and disposed in the same direction over a second or remaining part of the perimeter of the opening in the main body portion of the tank. Those portions of the interface between the cover and the main body of the tank where the leading edges are disposed in the same direction have a lower rupture strength than those parts where the leading edges are disposed in opposite directions. Thus, by changing the orientation of the leading edges of the two marginal portions which interface together to define the tank, a tank structure is formed having parts which have a greater likelihood of rupturing along one position or point on the tank than on other points or positions on the tank. Depending on the overall orientation of the tank when it is placed in service, the particular location where the marginal portions overlap in the same direction can be pre-selected such that the hazards of tank rupture are minimized. Several specific examples are given in the drawings and described in the following detailed description.

Because of the danger presented by the solids which could be released from the interior of the tank, in the event of the loss of the surrounding dielectric fluid, a retention means is provided. The retention means supports the solid electrical components located within the tank or enclosure and thereby minimizes the loss of those solid components should the tank rupture and dielectric fluid be lost. Several embodiments of the retention means are illustrated and described in detail.

The overlapping edge means can be formed so as to be integral with the main body portion of enclosure or integral with the cover. Alternatively, the overlapping edge means can include a separate reinforcement externally joined to the main body of the enclosure or the cover so as to provide additional strength to selected portions of the interface between the main body of the tank and the cover. The external position of the reinforcement facilitates fabrication. Moreover, the reinforcement can be added to existing tanks with little redesign.

Numerous other advantages and features of the present invention will become readily apparent from the following detailed description of the invention and its various embodiments, from the claims and from the accompanying drawings.

BRIEF DESCRIPTION OF THE DRAWINGS

FIG. 1 is a perspective view of a capacitor illustrating the internal components of the capacitor and the relationship between those components and the tank or housing formed around them;

FIG. 2 is a perspective view of a bank of capacitors of the type illustrated in FIG. 1 mounted atop a conventional utility pole;

FIGS. 3A, 3B and 3C are graphic illustrations of the manner in which the capacitor tank may be oriented;

FIG. 4A is a side elevational view of one embodiment of the capacitor tank shown in FIG. 1;

FIGS. 4B and 4C are partial, enlarged, cross-sectional, side elevational views of the upper and lower portions of the capacitor tank shown in FIG. 4A as viewed along lines 4B—4B and 4C—4C respectively;

FIGS. 5A, 5B and 5C are perspective views of the capacitor tank illustrating three embodiments of the retention means;

FIG. 6D is an enlarged, cross-sectional, side elevational view of the reinforcing means shown in FIG. 6A as viewed along line 6D—6D; and FIGS. 7A and 7B are partial, cut-away, side, elevational views of two embodiments of a capacitor tank having a reinforcing means which is an integral part of the cover and walls of the capacitor tank structure.

DETAILED DESCRIPTION OF THE PREFERRED EMBODIMENTS

Figure 6A:
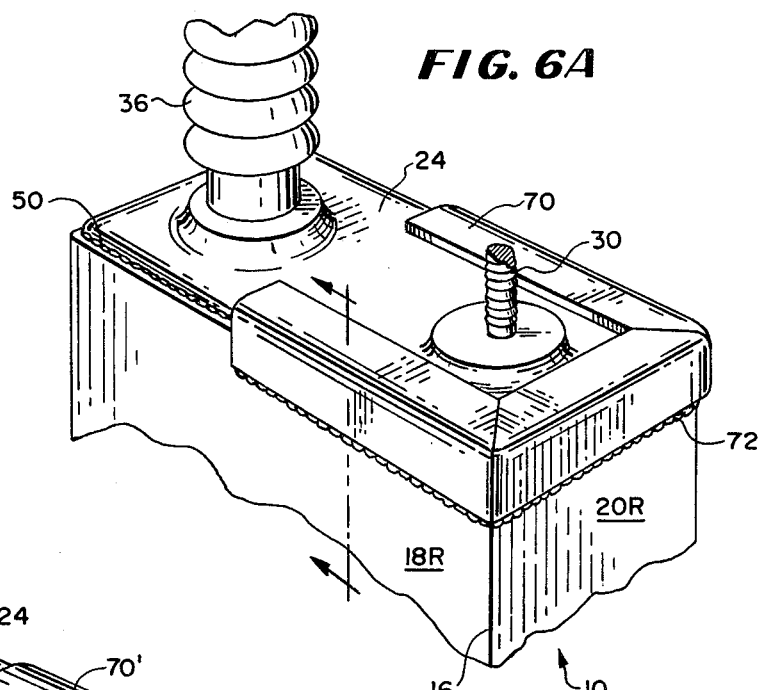
FIGS. 6A, 6B and 6C are perspective views of the capacitor tank shown in FIG. 1 illustrating three embodiments of a reinforcing means carried atop the cover portion of the capacitor tank.

While this invention is susceptible to embodiment in many different forms, there are shown in the drawings, which will herein be described in detail, several preferred embodiments of the invention. It should be understood, however, that the present disclosure is to be considered as an exemplification of the principles of the invention and is not intended to limit the invention to the specific embodiments illustrated.

The efficiency of power generation, transmission, and distribution equipment is improved when it is operated near unity power factor. The least expensive way to achieve unity power factor, is with the application of power-factor correction capacitors. Such a capacitor 10 is illustrated in FIG. 1. These capacitors provide a static source of leading reactive current and can be installed close to the load.

Capacitors for overhead distribution systems are typically pole-mounted 11 in banks 12 of 300 to 1800 KVAR at nearly any primary voltage up to 34.5 KV (phase to phase). FIG. 2 illustrates such a mounting arrangement. Capacitors of the type illustrated in FIG. 1 can also be pad-mounted. Such installation is often used for underground distribution systems. As a general rule, most capacitors installed on primary distribution feeders are connected in a grounded-wye arrangement. In a grounded-wye arrangement, the main frame or outer casing 16 of the capacitor 10 is held at ground potential. This provides increased personal safety. The connections between the capacitor terminals 30 and 32 and distribution feeder lines 13 include three series connected fuses 14. The fuses 14 protect the distribution system in the event of capacitor failure. The electrical scheme used to connect the capacitor bank 12 to the distribution system 13 are known to those skilled in the art (see U.S. Pat. No. 3,270,246). The principles followed in the selection of these fuses 14 are well known to those skilled in the art (*Standard Handbood for Electrical Engineers*, by Donald G. Fink, 11th Edition, Chapter 10, section 275). However, the techniques preferably followed in structural design of a capacitor, so as to minimize the hazard in the event of its rupture, are not well understood.

Returning to FIG. 1, a typical power-factor correction capacitor 10 comprises a tank-like outer casing or frame 16 having two sets of generally elongated side walls 18R, 20L, and 20R (only three of which are shown in the drawing), a bottom wall 22, and a cover 24. The walls may be formed from stainless steel and are usually protected with an enamel-like finish to resist corrosion and to facilitate dissipation of whatever heat may be generated within the capacitor 10. For convenience in handling, two opposite side walls 20L and 20R are often provided with lifting eyes 26. These eyes also facilitate installation of individual capacitors into the bank 12 shown in FIG. 2.

A plurality of capacitor packs 28 are disposed within the outer casing 16. Each capacitor pack includes wound layers of metal foil separated by a dielectric layer (e.g. aluminum foil and polypropylene film). Typically, the capacitor packs are grouped together in sub-units which are electrically connected together in parallel; each of the sub-units is, in turn, electrically connected in series to a set of capacitor terminals 30 and 32. The capacitor packs 28 are insulated from the outer casing 16 by a plurality of insulating layers 33 and from the cover 24 by insulation 48. The capacitor packs are impregnated with a liquid dielectric. The dielectric fluid completely fills all of the internal volume of the capacitor 10 (See U.S. Pat. No. 4,187,327).

The terminals 30 and 32 of the capacitor 10 are insulated from the cover 24 by a pair of bushings 34 and 36. These bushings 34 and 36 are typically formed from a wet processed porcelain which has been glazed for high strength and durability so as to withstand the surrounding environment. Typically, the bushings 34 and 36 are joined to the cover 24 by solder seals. These seals hermetically secure the bushings 34 and 36 to the capacitor cover 24 and keep the impregnating liquid in and contaminants out of the interior of the outer casing 16. Internal bushing leads 44 (only one being shown for purposes of clarity) are used to join the capacitor packs 28 to the capacitor terminals 30 and 32. Additional details of the internal structure of power-factor correction capacitors are described in U.S. Pat. Nos. 3,098,956; 3,377,530; 3,483,453; and 3,571,676 (all of which are assigned to the assignee of the present invention and for purposes of description are incorporated herein by reference).

In FIG. 2, six capacitors are arranged parallel to one another in a bank 12 with the capacitor bushings 34 and 36 disposed generally parallel to the center line 40 of the pole structure 11. Because of restrictions on vertical elevation, these capacitors may also be installed in banks with bushings 34 and 36 arranged generally horizontally. The vertical installation is illustrated in FIG. 3A. Horizontal installations are illustrated in FIGS. 3B and 3C. In FIG. 3B, the bushings (only one bushing 36 being shown for purposes of clarity) are disposed outwardly by or away from the center line 40 of the supporting structure. In FIG. 3C the bushings are disposed toward the center line 40 of the supporting structure.

Since a major cause of capacitor tank rupture is related to bushing fracture caused by melting and arcing of the internal bushing lead wire 44, or by melting of the bushing solder seal 42 at the top of the bushings, a modest increase in the cross-sectional area of the bushing lead wire will effect and improvement in the capacitor's time-to-rupture characteristic. Even if one of the bushings 34 and 36 should rupture little danger will be presented since gas and vapor will be released while discharging little, if any, of the dielectric liquid within the capacitor casing 16.

In the low current range, a fault current produces heat within the inside of the capacitor packs 28. This pressurizes the inside of the capacitor 10 which causes the outer casing 16 to swell. Swelling increases the internal volume and drops the level of the liquid dielectric below the top of the bushings 34 and 36 (FIG. 3A). Thus, the upper end of the bushing lead wire 44 is exposed to a vapor rather than a liquid. This causes that end of the bushing to increase in temperature, ultimately resulting in thermal fracture of the porcelain bushing.

If the capacitor bushings 34 and 36 are disposed horizontally (as in FIGS. 3B and 3C), or if the bushings are disposed vertically (as in FIG. 3A), and the bushing lead wire 44 has a relatively large cross-sectional area, such that it is less likely to overheat, rupture or fracture of the bushings will be less likely to occur. Thus, failure of the bushings cannot be relied upon to protect the capacitor casing 16 from rupture.

It should be clear that to minimize the liquid lost in the event of a rupture of the capacitor casing 16 and the damage caused to the surroundings by the release of that liquid, the point of rupture should preferably be located at the upper end of the capacitor 10 and at a position away from the center line 40 of a supporting structure. The vapor released 46 (see FIGS. 3A, 3B, and 3C) under these circumstances will tend to be dissipated without falling on the supporting structure. Thus, damage to the supporting structure and the likelihood of secondary fires will be minimized.

Turning to FIG. 4A, the outer casing 16 and the manner in which the cover 24 or bottom wall 22 is joined to the side walls 18R, 18L, 20R, and 20L of the outer casing will now be described with reference to two specific joint structures. The cover 24 and the bottom wall 22 are generally domed or dished members which fit within the interior of the side walls 20L, 18R, and 20R of the capacitor casing 16. This relationship is best illustrated in FIGS. 4B and 4C. In FIG. 4B, the upper end of the outer casing 16 is joined to the cover 24 with a peripheral fillet weld 50. The leading edges 52 and 54 of the marginal portions of the walls (here 18R) forming the outer casing 16 and the cover 24, respectively, lie in an overlapping relationship and are disposed in opposite directions. When the cover 24 is joined to the outer casing 16 in this manner, it should be observed that whatever internal pressure is built up within the capacitor 10 is distributed along all internal surfaces of the leading edge 54 of the cover 24 and along only one side of the leading edge 52 of the outer casing 16. Thus, the forces (represented by arrows 56 and 58) tending to separate the cover 24 from the side walls (here 18R) of the outer casing, are generally at right angles to each other. The significance of this will be apparent once the joint structure shown in FIG. 4C is understood.

FIG. 4C, illustrates another method of joining the vertical walls of the outer casing 16 to the cover 24 or bottom wall 22. In particular, FIG. 4C illustrates the details of how the bottom wall 22 is joined to the vertical walls of the outer casing 16. A fillet weld 60 is applied to the leading edges 62 and 64 of the marginal portions at the lower end of the vertical walls and the bottom wall. It will be noted that these leading edges 62 and 64 lie in an overlapping relationship and are disposed in the same direction. Since the internal pressure, or the pressure within the capacitor 10, is applied to only one side of the two leading edges 62 and 64, the forces (represented by arrows 66 and 68) applied to these edges are generally parallel to one another and in opposite directions. This relationship maximizes the tendency of the two leading edges, 62 and 64 to separate from one another and imposes the greatest stress across the fillet weld 60. Thus, comparatively speaking, the structural joint or edge means used to join the edges of the vertical walls of the outer casing 16 to the cover 24 (FIG. 4B), is generally stronger than the structural joint or edge means used to join the vertical walls of the outer casing 16 to the bottom wall 22 (FIG. 4C). Once this is understood, it should be clear that by overlapping the leading edges of the two members forming a joint (whether joining the outer casing 16 to the cover 24 or the bottom wall 22) in the same direction, a tank structure is formed which has a greater likelihood of rupturing or failing than one where the marginal portions overlap each other with the leading edges disposed in opposite directions. Thus, by judicious selection of the two edge means shown in FIGS. 4B and 4C, one is able to pre-select the position where a rupture will occur in the event of an overpressure condition within the capacitor 10.

Referring to FIGS. 7A and 7B, a capacitor 10 is illustrated where the cover 24 has been joined to the outer casing 16 such that the leading edges of the marginal portions of the cover and the vertical walls of the outer casing overlap each other in the same direction along one (i.e. 20L) of the vertical walls at the upper end of the capacitor. In FIGS. 7A and 7B, all the vertical walls are joined to the bottom wall 22 (and the remaining parts of the upper end of the vertical walls) in the same manner as that illustrated in FIG. 4B. This insures that the weakest seam or joint is where the marginal portions are overlayed with the leading edges disposed in the same direction (e.g. at the top of the tank next to bushing 36).

Figure 6B:
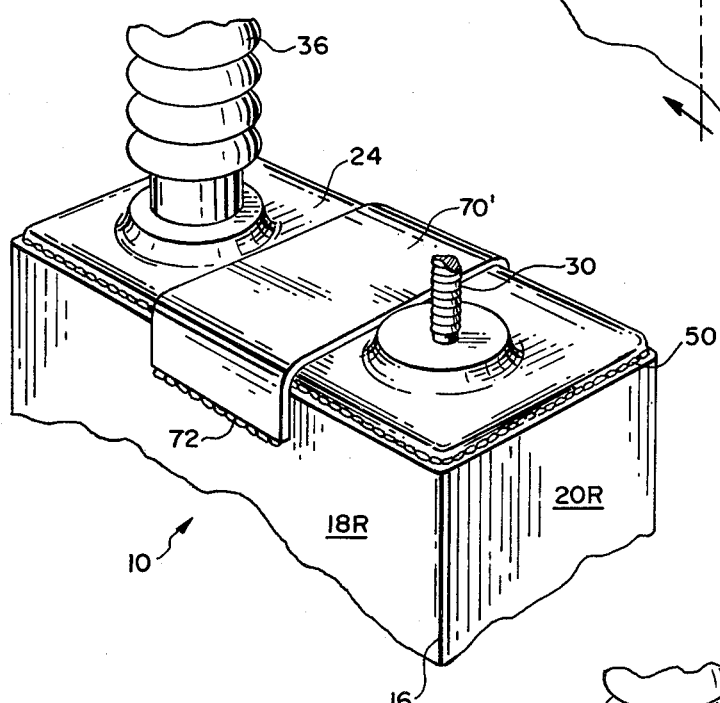
Figure 6C:
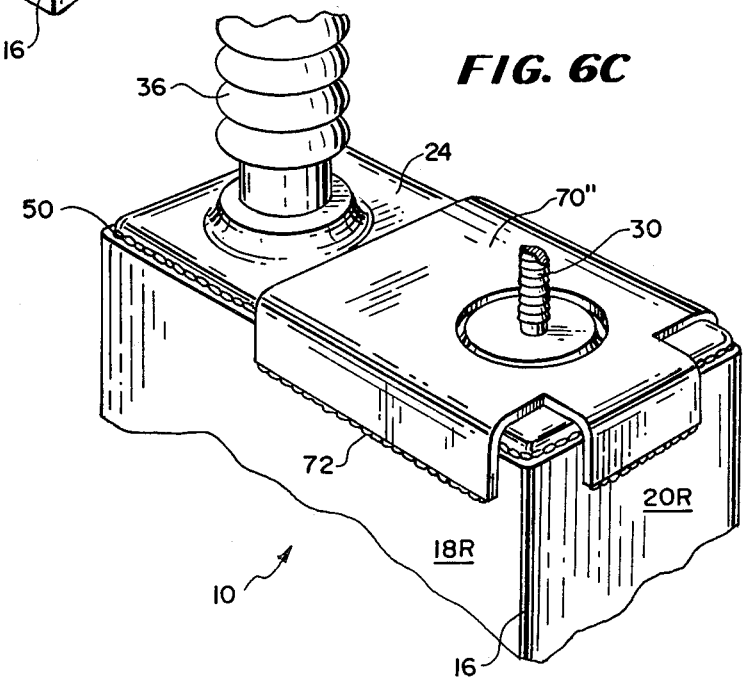

Even where all the vertical walls of the outer casing 16 are joined to the bottom wall 22 and the cover 24 using the edge means illustrated in FIG. 4B, the location at which rupture of a welded joint is likely to occur can be controlled by selectively reinforcing the joint. A reinforcing structure is illustrated in FIGS. 6A, 6B and 6C. In each of the embodiments illustrated in FIGS. 6A, 6B and 6C, an additional member or reinforcement 70 has been added atop the cover 24. In FIG. 6A, the reinforcement 70 is a generally U-shaped collar or coaming which covers three of the four edges at the upper end of the capacitor 10. In FIG. 6B, the reinforcement 70' is joined to two opposite vertical side walls of the outer casing 16. This reinforcement 70' is disposed between the two bushings 36 (only one being shown in FIG. 6B for the purpose of clarity) and spans the upper surface of the cover 24.

The reinforcement 70" shown in FIG. 6C, combines the features of the reinforcements 70 and 70' shown in FIGS. 6A and 6B respectfully. In FIG. 6C, the reinforcement 70" spans a major portion of the cover 24 and is joined to three of the vertical walls forming the outer casing 16. Because of the strength provided by the reinforcement, those portions of the interface (i.e. the welded seam or edge) between the cover 24 and the outer casing 16 of the capacitor 10 which are not occupied by the reinforcement have a greater likelihood of rupturing in the event an overpressure condition develops in the capacitor. FIG. 6D shows the details of one method of joining the reinforcement 70 to the upper end of the outer casing 16. The reinforcement 70 is joined to the outer marginal portions of the vertical side wall 18 of the outer casing 16 by welding 72. It should be clear from the drawings that other members can be used to reinforce selected portions of the capacitor tank or outer casing 16 such that the location of rupture can be predicted with some certainty.

If the location of rupture occurs at the upper end of the capacitor 10 (See FIGS. 3A, 3B and 3C), there is little likelihood that liquid or solid portions of the capacitor packs 28 within the outer casing 16 will be released or discharged. However, in the event that a rupture occurs at the lower end seam or side seam of the outer casing 16, there is a greater likelihood that solid materials will be discharged as well as dielectric fluid. To increase the likelihood that solids will be retained in the event that a rupture occurs alone one of the bottom seams, joints or connections, a retention means should be provided.

FIGS. 5A, 5B and 5C illustrate three embodiments of the retention means or restraining straps 74. In FIG. 5A, the retention means 74 is a generally U-shaped strap which spans across the bottom of the outer casing 16 of capacitor 10 between the two narrow walls 20R and 20L of the outer casing. In FIG. 5B, retention means 74' is formed from two U-shaped straps, located on the inside of the outer casing 16, which span between the two wider walls forming the outer casing. In FIG. 5C, the retention means 74" is formed from two U-shaped straps which span between the outside walls of the outer casing 16 along the exterior of the bottom wall 22. The retention means is preferably joined to the walls of the outer casing 16 by welding. Thus, in the event that the seam or interface between the bottom wall 22 and the lower portion of the vertical walls which form the outer casing 16 ruptures, the retention means tends to hold the solid material at the inside of the capacitor 10 while allowing the liquid to drain. It also tends to reduce the rate of release of the liquid by using the captured solid material to restrict the flow of fluid out of the capacitor. The likelihood of a fire is reduced, if not eliminated, by retaining solid material within the capacitor.

Thus, it should be apparent that in accordance with the present invention a unique tank structure has been provided for housing the internal components of an electrical apparatus such as a capacitor in such a manner that the location of rupture can be pre-selected so as to minimize the loss of dielectric fluid and the discharge of solid matter. Moreover, the tank structure is readily adaptable to current design practices without requiring a complete redesign of the casing or the electrical apparatus housed within the casing. While the invention has been described in conjunction with several specific embodiments, it is evident that there are many alternatives, modifications, and variations which will be apparent to those skilled in the art in light of the foregoing description. Accordingly, it is intended to cover all such alternatives, modifications, and variations as set forth within the spirit and broad scope of the claims set forth below.

What is claimed is as follows:

1. A tank adapted to confine a dielectric fluid about an electrical component, comprising:
   (a) an enclosure defining an opening and having marginal portions whose leading edges form the perimeter of said opening;
   (b) a cover having marginal portions whose leading edges are complementary to the opening in said enclosure and disposed in an overlapping relationship with the marginal portions of said enclosure adjacent said opening, the respective leading edges of said marginal portions being disposed in opposite directions over a first part of the perimeter of said opening and disposed in the same direction over the remaining part of the perimeter of said opening; and
   (c) pressure sealing edge means for joining together the marginal portions of said cover and said enclosure,
   whereby excessive pressure developed within the tank, defined by said cover and said enclosure, forces said cover and enclosure apart and ruptures said edge means along said remaining part of the perimeter of said opening in preference to said first part of the perimeter of said opening.

2. The tank set forth in claim 1, further including: an electrical component housed within said enclosure; and electrical connection means, carried by said cover, for electrically connecting said electrical component with the exterior of said enclosure.

3. The tank set forth in claim 1, wherein said enclosure is elongated having two ends, one of said ends having marginal portions which are adjacent said opening and whose leading edges are disposed generally parallel to the longitudinal axis of said enclosure along said first part of the perimeter of said opening; and wherein said enclosure includes: at its other end a bottom port;
   a bottom cover, which is generally complementary to said port and which has marginal portions whose leading edges are disposed in an overlapping relationship with the marginal portions of said bottom port, the respective leading edges being disposed in the same direction; and
   second pressure sealing edge means for joining together the edges of said bottom port and said bottom cover.

4. The tank set forth in claim 2, wherein said tank is filled with a dielectric fluid and wherein said electrical component includes at least two interconnected parts which are generally fixed relative to said enclosure, at least one of which is released from the remaining part to the lower end of said enclosure in the event that said dielectric fluid leaks from the interior of said enclosure and said electrical component becomes overheated;

further including retention means, carried by the lower end of said enclosure, for strengthening the lower end of said enclosure.

5. The tank set forth in claim 3, further including at its other end a generally U-shaped bracket, spanning said bottom port, for reinforcing said second pressure sealing edge means.

6. The tank set forth in claim 5, wherein said bracket is disposed at the exterior of said enclosure.

7. The tank set forth in claim 1, further including reinforcement means, disposed atop said cover adjacent said first part, for reinforcing the joint formed between said enclosure and said cover by said edge means.

8. A tank for confining a dielectric fluid about an electrical component, comprising:
   (a) an enclosure defining an open top end and an open bottom end;
   (b) a top cover generally complementary to said top end and disposed within said enclosure adjacent said top end;
   (c) a bottom cover generally complementary to said enclosure bottom end and disposed within the interior of said enclosure adjacent its bottom end, the marginal edges of said bottom cover being disposed opposite to the marginal edges of said enclosure at its bottom end;
   (d) means, carried by said top cover, for electrically connecting the interior with the exterior of said enclosure; and
   (e) overlapping edge means for joining the marginal edges of said enclosure along its top end with the leading edges of said top cover and said enclosure disposed in opposite directions over a first portion of the perimeter of said top open end and in the same direction over the remaining perimeter of said top open end,
   whereby the rupture strength of the top of the tank thereformed along said first portion of said perimeter is greater than the rupture strength of the top of the tank along the remaining perimeter, said tank having propensity to rupture preferentially along said remaining perimeter.

9. The tank set forth in claim 8, wherein said tank is filled with dielectric fluid and further including the electrodes of a capacitor, said fluid being disposed between said electrodes.

10. A method of fabricating a tank to house an electrical apparatus immersed in an dielectric fluid such that the tank will rupture at a preselected location, comprising the steps of:
   (a) forming a fluid-tight enclosure having at least one opening and marginal edge portions surrounding said opening;
   (b) forming a cover, having marginal edge portions, for sealing said opening;
   (c) joining said cover to said enclosure along a first part of the periphery of said opening with the marginal portions of said enclosure and said cover adjacent said opening lying in an overlapping relationship such that the leading edges of the respective marginal portions are disposed in opposite directions; and
   (d) joining said cover to said enclosure along a remaining part of the periphery of said opening with the marginal portions of said enclosure and said cover adjacent said cover lying in an overlapping relationship such that the leading edges of the respective marginal portions are disposed in the same direction,
   whereby said enclosure and said cover have a greater tendency to split apart along said remaining part before splitting apart along said first part in the event of overpressurization of the interior of the tank thereformed.

11. A tank to house an electrical apparatus immersed in a dielectric fluid, comprising;
   (a) a first member adapted to receive an electrical apparatus and to confine a dielectric fluid therein;
   (b) a second member joined to said first member and disposed at generally right angles to said first member to form a pressure tight enclosure, said members defining a joint at their common interface, said first member and said second member having marginal edge portions disposed in opposite directions so as to overlap one another along said interface; and
   (c) a coaming member, attached to said first member and disposed on the exterior of said enclosure along a selected portion of said interface between said first member and said second member, said edge portions of said first member being interposed between said coaming member and said second member for reinforcing said joint between said first member and said second member,
   whereby in the event of overpressurization of the interior of said enclosure, there is a greater tendency for said enclosure to rupture along that part of the joint between said first member and said second member which is not occupied by said coaming.

* * * * *